United States Patent
Wang et al.

(10) Patent No.: US 8,819,715 B2
(45) Date of Patent: Aug. 26, 2014

(54) SET-TOP BOX CHANNEL TUNING TIME MEASUREMENT

(75) Inventors: Dongchen Wang, Concord, MA (US); Hong Xiao, Acton, MA (US); Andre Turner, Belmont, MA (US); Armando Paul Stettner, Westford, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 268 days.

(21) Appl. No.: 13/171,727

(22) Filed: Jun. 29, 2011

(65) Prior Publication Data

US 2013/0007789 A1   Jan. 3, 2013

(51) Int. Cl.
*H04H 60/32* (2008.01)

(52) U.S. Cl.
USPC ........................................................ 725/14

(58) Field of Classification Search
CPC ................... H04N 21/42204; H04N 21/4263; H04N 21/4383; H04N 21/4384; H04N 21/40; H04N 21/4356; H04N 21/436; H04N 21/443; H04N 21/63; H04N 21/239; H04N 21/26216; H04N 21/2668
USPC ........... 725/14, 40, 46, 68, 87, 100, 107, 116, 725/131, 13, 31, 32; 705/10; 709/218; 370/232, 252; 348/731
See application file for complete search history.

(56) References Cited

U.S. PATENT DOCUMENTS

| | | | |
|---|---|---|---|
| 8,146,125 B2 * | 3/2012 | Grinkemeyer et al. | 725/107 |
| 2007/0011039 A1 * | 1/2007 | Oddo | 705/10 |
| 2008/0300965 A1 * | 12/2008 | Doe | 705/10 |
| 2010/0195496 A1 * | 8/2010 | Holm-Oste et al. | 370/232 |

* cited by examiner

*Primary Examiner* — Nasser Goodarzi
*Assistant Examiner* — An Nguyen

(57) ABSTRACT

A network device receives, across a network, measurements of channel tuning times from multiple, different set-top boxes (STBs), where the channel tuning times are measured internally within each of the multiple, different STBs. The network device stores the measurements of the channel tuning times as data in a data structure and analyzes channel tuning behavior of at least one of the multiple, different STBs based on the data stored in the data structure. The network device generates a report of the channel tuning behavior of the at least one of the multiple, different STBs.

24 Claims, 10 Drawing Sheets

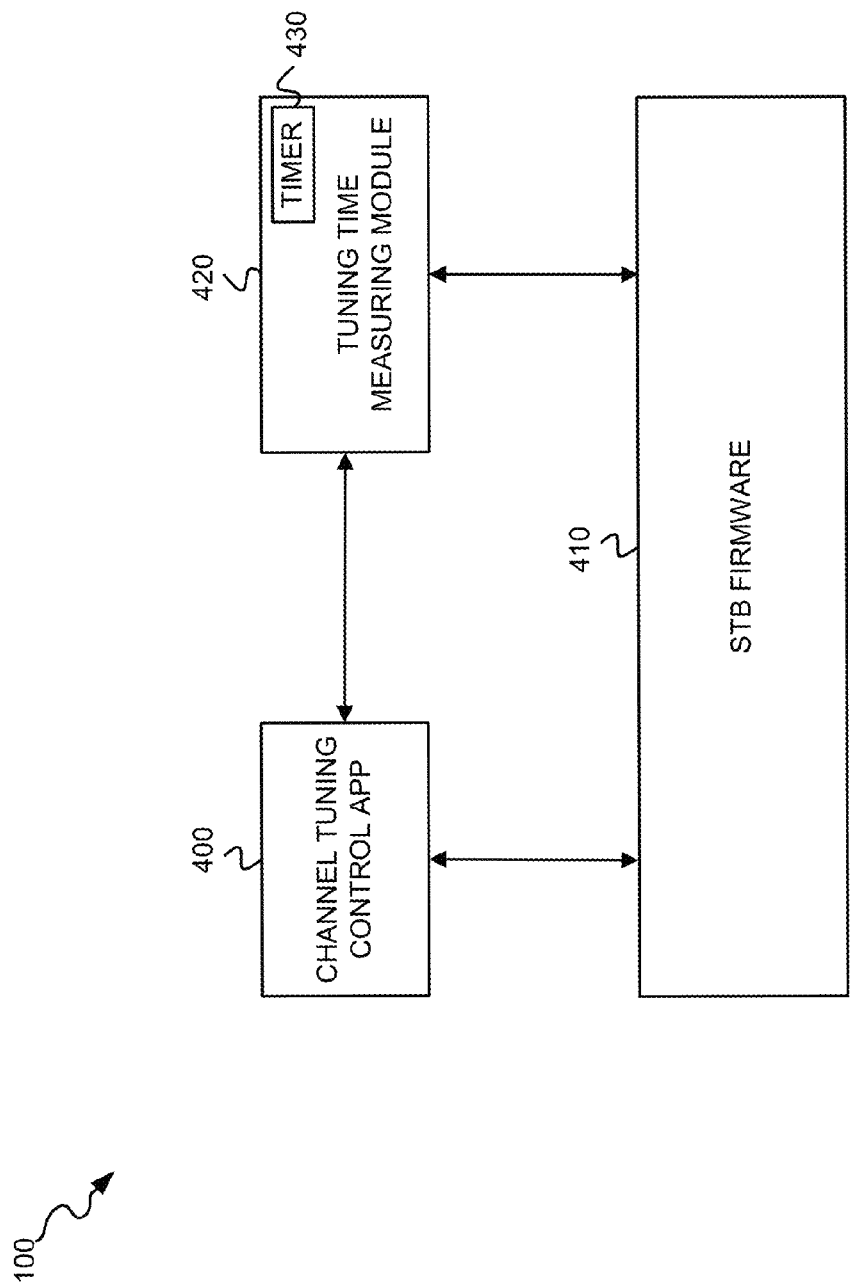

SET-TOP BOX CHANNEL TUNING TIME MEASUREMENT

BACKGROUND

Set-Top Boxes (STBs) are used for tuning among channels on a network, such as, for example, a cable network (e.g., an optical fiber network) to acquire and lock to specific channels to enable content transmitted on those channels to be displayed on display devices (e.g., televisions) connected to each of the STBs. The time each STB takes to acquire and lock to the channels is the "channel tuning time" of the STB. The channel tuning time of the STB is an important parameter for evaluating STB design, overall customer experience, and content streaming design.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Figure 1:
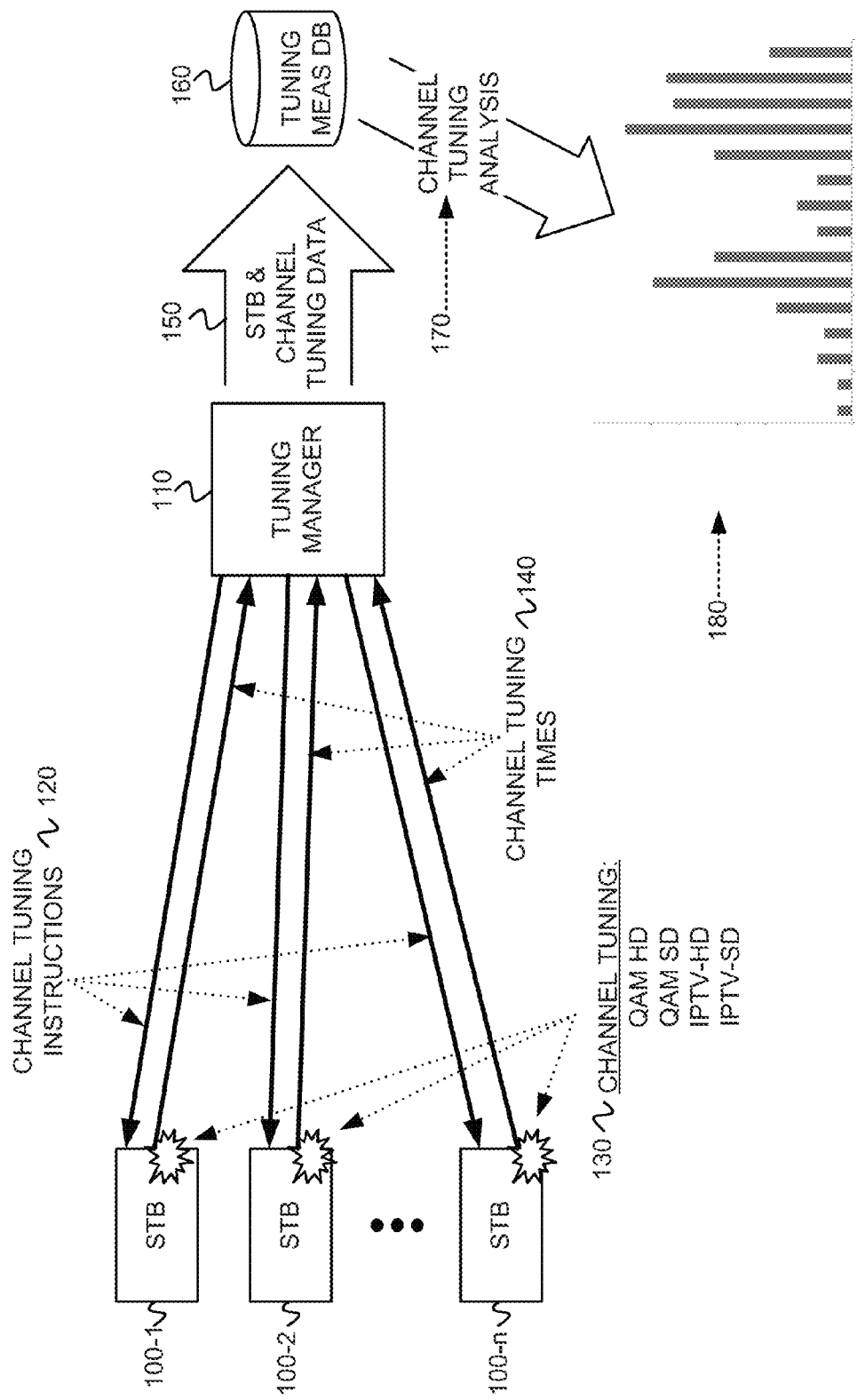
FIG. 1 is a diagram that depicts an exemplary overview of the conduct of channel tuning time measurements at multiple set-top boxes in a network, and the reporting of those channel tuning time measurements to a tuning manager across the network for channel tuning analysis.

FIG. 1 illustrates an overview of the conduct of channel tuning time measurements at multiple set-top boxes STBs) 100-1 through 100-n in a network (not shown), and the reporting of those channel tuning time measurements to a tuning manager 110 across the network for channel tuning analysis. Each of STBs may include a device that connects to a television (or other display device) and to an external source of signals via a network, and that tunes to channels on the network to display the signals as content on the television (or other display device). Tuning manager 110 may include one or more network devices, such as servers, connected to STBs 100-1 through 100-n via one or more networks and which may issue commands related to the conduct of channel tuning time measurements to STBs 100-1 through 100-n, and may store and analyze channel tuning time measurements (and possibly other data), conducted internally within each STB, and then reported from STBs 100-1 through 100-n. "Channel tuning time" as described herein refers to the time span between the time a channel change request is issued to firmware of a STB and the time when the firmware provides a notification indicating that a program signal has been acquired and locked. The channel tuning process within the STB may involve a complicated series of internal system activities, such as tuning to a correct QAM frequency, locating the multiplexed program stream, receiving authorization, etc.

FIG. 1 depicts tuning manager 110 issuing channel tuning instructions 120 to STBs 100-1 through 100-n. The channel tuning instructions 120 may include instructions commanding STBs 100-1 through 100-n to engage in channel tuning behavior based on data included in channel tuning instructions 120. Channel tuning instructions 120 received at each STB 100 may include instructions specifically tailored to that STB, or may include instructions sent out to a set of STBs. Channel tuning instructions 120 may include specifics as to what channels to tune to (e.g., a sequence of channel changes), the intervals to wait between channel changes, how often to perform a given channel changing sequence, and/or how often to report back measured channel tuning times to tuning manager 110.

As shown in FIG. 1, the channel tuning 130 may include the STBs tuning to Quadrature Amplitude Modulated (QAM) High Definition (HD) channels (Motion Picture Experts Group-2 (MPEG-2) or MPEG-4), QAM standard definition (SD) channels (MPEG-2 or MPEG-4), Internet Protocol Television (IPTV) HD channels (MPEG-2 or MPEG-4), or IPTV SD channels. STBs 100-1 through 100-n, however, may tune to various different types of channels, including channel types not specifically described herein, and the channel types specifically listed herein represent a few examples. One type of channel change may include an inter-QAM SD channel change in which there is a change in channels between two standard definition virtual channels that reside in two different QAM frequency bands. Another type of channel change may include an intra-QAM SD channel change in which there is a change in channels between two standard definition virtual channels that reside in the same QAM frequency band. A further type of channel change may include an inter-QAM HD channel change in which there is a change in channels between two high definition virtual channels that reside in two different QAM frequency bands. Not all STBs may have the capability to tune to all different types of channels. Either tuning manager 110 may take this into account for each STB 100 when generating channel tuning instructions for that STB, or each STB receiving channel tuning instructions may selectively channel tuning instructions related to channels that the STB does not have the capability to tune to.

Based on channel tuning instructions 120, STBs 100-1 through 100-n may engage in channel tuning behavior resulting in internally calculated channel tuning times 140. Channel tuning times 140 may be reported from STBs 100-1 through 100-n to tuning manager 110 via the network (not shown). Each report of channel tuning times 140 may additionally include other data, such as, for example, identifications of each STB 100 from which the channel tuning time has been reported, times over which the channel tuning was conducted, etc. Tuning manager 110 may store STB and channel tuning data 150, associated with the channel tuning times 140 reported to tuning manager 110, in tuning measurement database (DB) 160. Tuning measurement DB 160 may include any type of data structure that may store STB and channel tuning data 150 that may be subsequently retrieved for analysis.

As further shown in FIG. 1, tuning manager 110 may use STB and channel tuning data stored in tuning measurement DB 160, and/or configuration or command instructions received from client devices (not shown), to conduct a channel tuning analysis 170 associated with one or more of STBs 100-1 through 100-n. The channel tuning analysis 170 may generate one or more reports 180 of channel tuning behavior of the STB(s).

Figure 2:
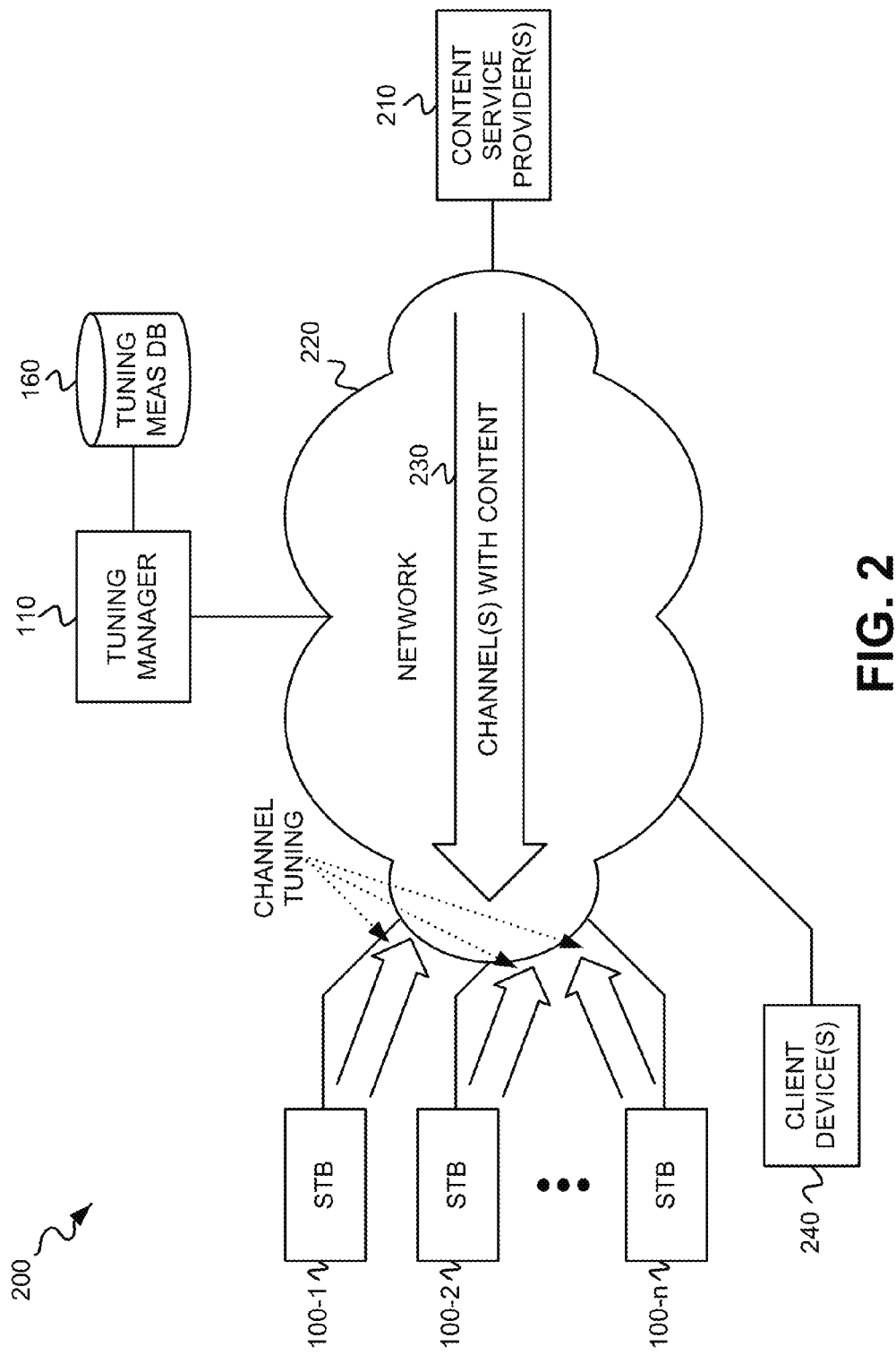
FIG. 2 is a diagram that illustrates an exemplary network environment in which set-top boxes may conduct channel tuning time measurements and report those channel tuning time measurements to the tuning manager of FIG. 1 for channel tuning analysis.

FIG. 2 is a diagram that illustrates an exemplary network environment 200 in which STBs 100-1 through 100-n may conduct channel tuning time measurements and report those channel tuning time measurements to tuning manager 110 for channel tuning analysis. As shown in FIG. 2, network environment 200 may include STBs 100-1 through 100-n, tuning manager 110, tuning measurement DB 160, content service provider(s) 210, network 220, and client device(s) 240. Content service provider(s) 210 may include one or more network devices that may provide programming content to one or more of STBs 100-1 through 100-n via one or more channels 230 over network 220. The channels 230 may include, for example, QAM HD, QAM SD, IPTV-SD, or IPTV HD channels.

Network 220 may include any type of network, or combination of networks, that may provide programming content to STBs 100-1 through 100-n via one or more channels. Network 220 may include a cable network (e.g., an optical cable network), a wireless satellite network, a wireless public land mobile network (PLMN) (e.g., a Code Division Multiple Access (CDMA) 2000 PLMN, a Global System for Mobile Communications (GSM) PLMN, a Long Term Evolution (LTE) PLMN and/or other types of PLMNs), a telecommunications network (e.g., a Public Switched Telephone Network (PSTN)), a local area network (LAN), a wide area network (WAN), a metropolitan area network (MAN), an intranet, and/or the Internet. Client device(s) 240 may include one or more devices that may execute tuning management console functions that may configure, monitor and/or send command instructions to one or more of STBs 100-1 through 100-n and/or tuning manager 110.

The configuration of network components of network environment 200 illustrated in FIG. 2 is for illustrative purposes only. Other configurations may be implemented. Therefore, network environment 200 may include additional, fewer and/or or different components than those depicted in FIG. 2.

Figure 3:
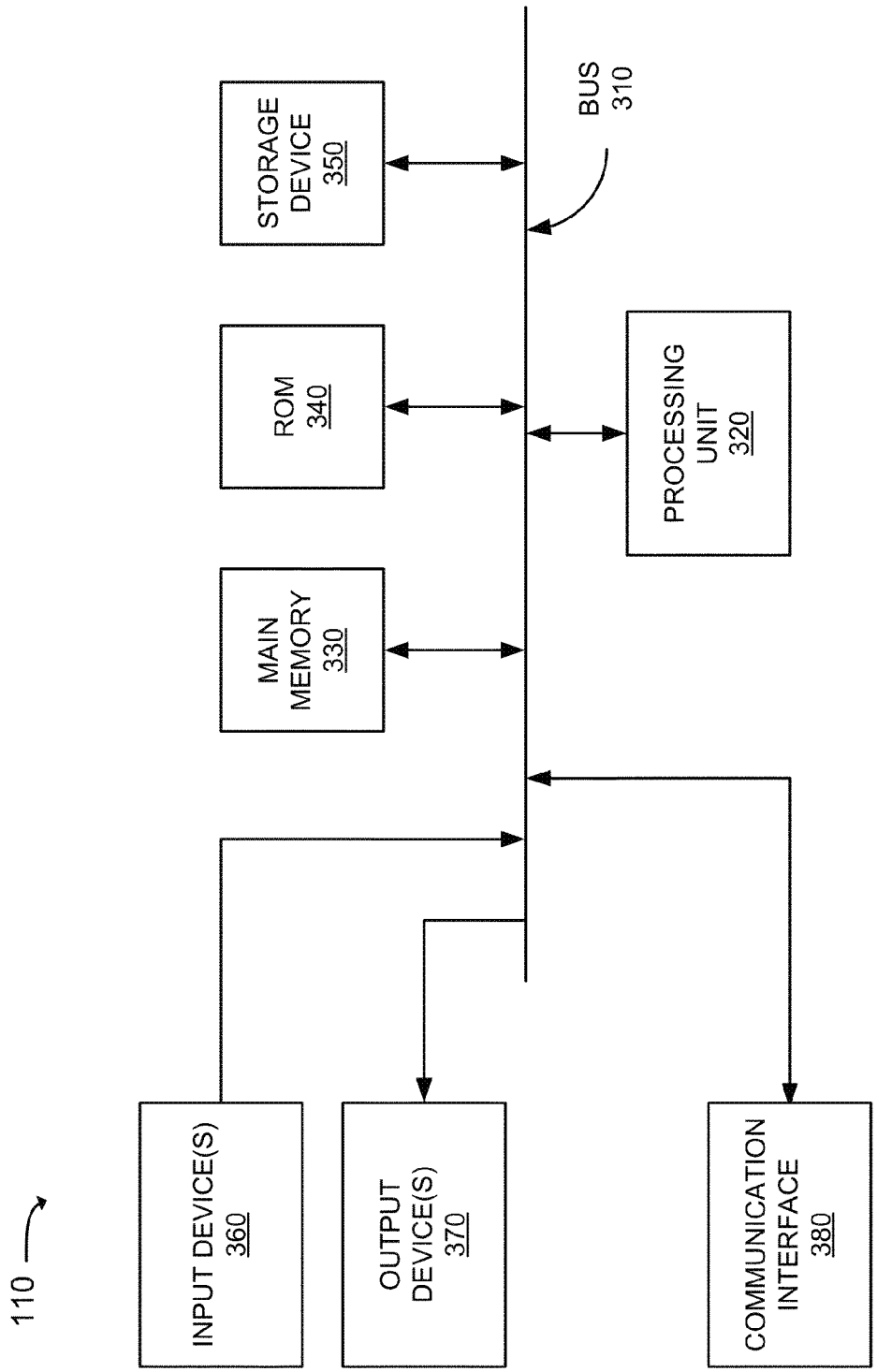
FIG. 3 is a diagram that depicts exemplary components of the tuning manager of FIGS. 1 and 2.

FIG. 3 is a diagram that depicts exemplary components of tuning manager 110 in an exemplary implementation in which tuning manager 110 includes a server. Client device 240 may be similarly configured. Tuning manager 110 may include a bus 310, a processing unit 320, a main memory 330, a read only memory (ROM) 340, a storage device 350, an input device(s) 360, an output device(s) 370, and a communication interface 380. Bus 310 may include a path that permits communication among the elements of tuning manager 110.

Processing unit 320 may include one or more processors or microprocessors, or processing logic, which may interpret and execute instructions. Main memory 330 may include a random access memory (RAM) or another type of dynamic storage device that may store information and instructions for execution by processing unit 320. ROM 340 may include a ROM device or another type of static storage device that may store static information and instructions for use by processing unit 320. Storage device 350 may include a magnetic and/or optical recording medium.

Input device 360 may include one or more mechanisms that permit an operator to input information to tuning manager 110, such as, for example, a keypad or a keyboard, a display with a touch sensitive panel, voice recognition and/or biometric mechanisms, etc. Output device 370 may include one or more mechanisms that output information to the operator, including a display, a speaker, etc. Communication interface 380 may include any transceiver mechanism that enables tuning manager 110 to communicate with other devices and/or systems. For example, communication interface 380 may include wired or wireless transceivers for communicating via network 220.

The configuration of components of tuning manager 110 illustrated in FIG. 3 is for illustrative purposes only. Other configurations may be implemented. Therefore, tuning manager 110 may include additional, fewer and/or different components than those depicted in FIG. 3.

Figure 4A:
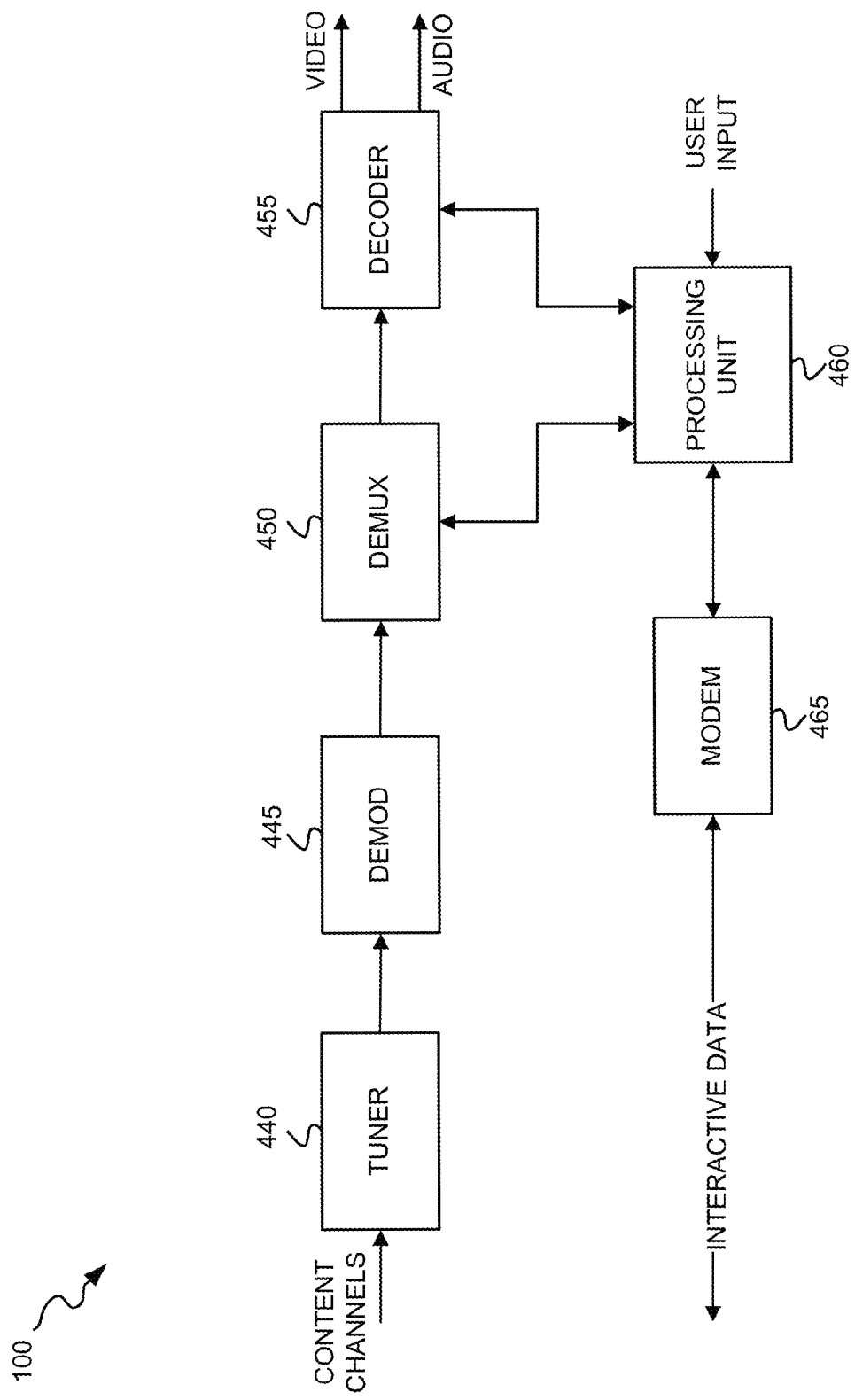
FIG. 4 depicts exemplary components of a set-top box of FIGS. 1 and 2.

FIG. 4A depicts exemplary components of a STB 100. STB 100 may include a tuner 440, a demodulator 445, a demultiplexer 450, a decoder 455, a processing unit 460, and a modem 465.

Tuner 440 may select and tune to specific broadcast television information by tuning to one of many different input channels. Each channel may be digitally modulated using, for example, quadrature amplitude modulation (though other types of modulation may be used). Demodulator 445 may demodulate the information in the channel selected by tuner 440 to produce a transport stream (e.g., MPEG-2 or MPEG-4 transport stream) containing the audio, video and/or other information related to the selected TV program.

Demultiplexer 450 may select and decrypt compressed audio and video from the transport stream for the particular TV program that the STB user wishes to watch. Decoder 455 may decode and decompress the decrypted audio and video information for the selected TV program. Processing unit 460 may include, for example, a microprocessor that controls the operations performed by tuner 440, demodulator 445, demultiplexer 450 and decoder 455 based on user input. Modem 465 may send and receive interactive data (e.g., digital program guide information) that may be processed by processing unit 460.

The configuration of components of STB 100 illustrated in FIG. 4A is for illustrative purposes only. Other configurations may be implemented. Therefore, STB 100 may include additional, fewer and/or different components than those depicted in FIG. 4A.

FIG. 4B depicts exemplary functional components of a STB 100. The functional components of STB 100 shown in FIG. 4B may be implemented by processing unit 460 of FIG. 4A. As shown in FIG. 4B, the functional components of STB 100 may include a channel tuning control application 400, STB firmware 410, a tuning time measuring module 420, and a timer 430.

Channel tuning control application 400 may include an application that may initiate channel tuning and may monitor tuning time measuring module 420 for a calculated channel tuning time for each channel change. Channel tuning control application 400 may provide channel tuning times to a locally connected external device (e.g., via an output port to a computer), or to tuning manager 110 across network 220 (e.g., via a communication interface). STB firmware 410 may include functionality for controlling the basic operations of STB 100, including the internal operations associated with changing to a new channel, such as, for example, tuning to a QAM frequency, locating a multiplexed program stream, obtaining authorization, etc. Tuning time measuring module 420 may include an application that receives channel changing instructions from channel tuning control application 400, and which measures a start time and a stop time associated with each channel tuning operation performed by STB firmware 410. Tuning time measuring module 420 may calculate each channel tuning time, and provide the calculated channel tuning time to channel tuning control application 400. Timer 430 may include a timing device that maintains an accurate time to at least a millisecond resolution. Tuning time measuring module 420 may record an output of timer 430 at a beginning of a channel tuning process, and at an end of the channel tuning process.

The configuration of components of STB 100 illustrated in FIG. 4 is for illustrative purposes only. Other configurations may be implemented. Therefore, STB 100 may include additional, fewer and/or different components than those depicted in FIG. 4. For example, STB 100 may include one or more output ports, and a communication interface for communicating with tuning manager 110 via network 220, that are not shown in FIG. 4.

Figure 5:
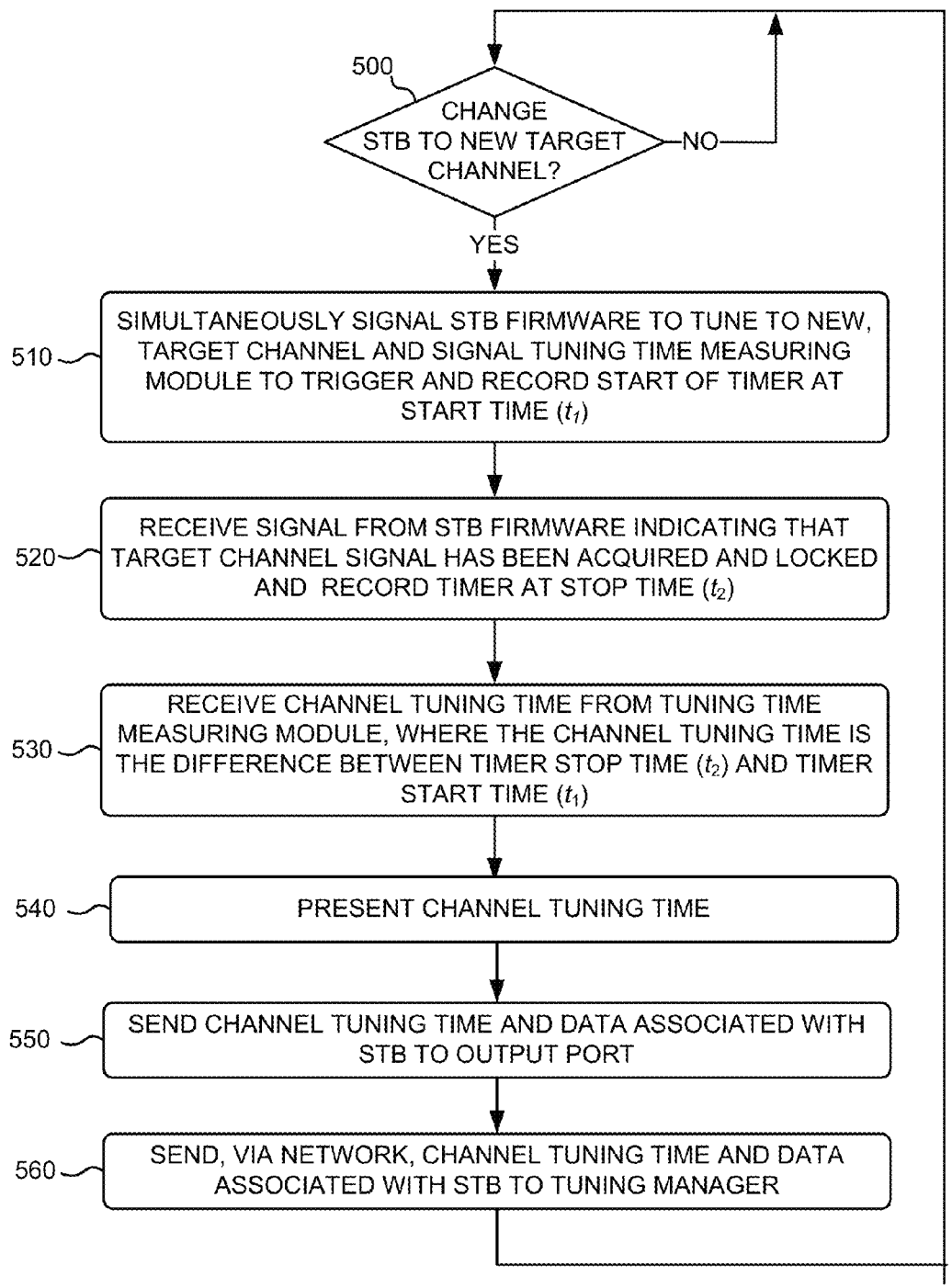
FIG. 5 is a flow diagram that illustrates an exemplary process for internally measuring a channel tuning time associated with the changing of a channel within a STB 100.

FIG. 5 is a flow diagram that illustrates an exemplary process for internally measuring a channel tuning time associated with the changing of a channel within a STB 100. The exemplary process of FIG. 5 may be implemented by channel tuning control application 400 of STB 100. The exemplary process of FIG. 5 is described below with reference to the diagram of FIG. 6.

The exemplary process may include determining if STB 100 should be changed to a new, target channel (block 500). A user of STB 100 may initiate a channel change, or tuning manager 110 may provide channel tuning instructions to STB 100 via network 220. For example, a user of STB 100 may press a channel change button on a remote control associated with STB 100 to initiate a channel change. The channel tuning instructions from tuning manager 110 may include instructions to tune to a single new channel, or may include instructions detailing a series of channel changes. In some implementations, STB 100 may apply "intelligence" to determine whether to change to the target channel. The application of "intelligence" to the channel changing may include considering whether all tuners are currently in use (e.g., either by a user watching TV, or by the DVR recording a TV program), and possibly waiting to a time when at least on tuner is not in use to perform a channel change.

Figure 6:
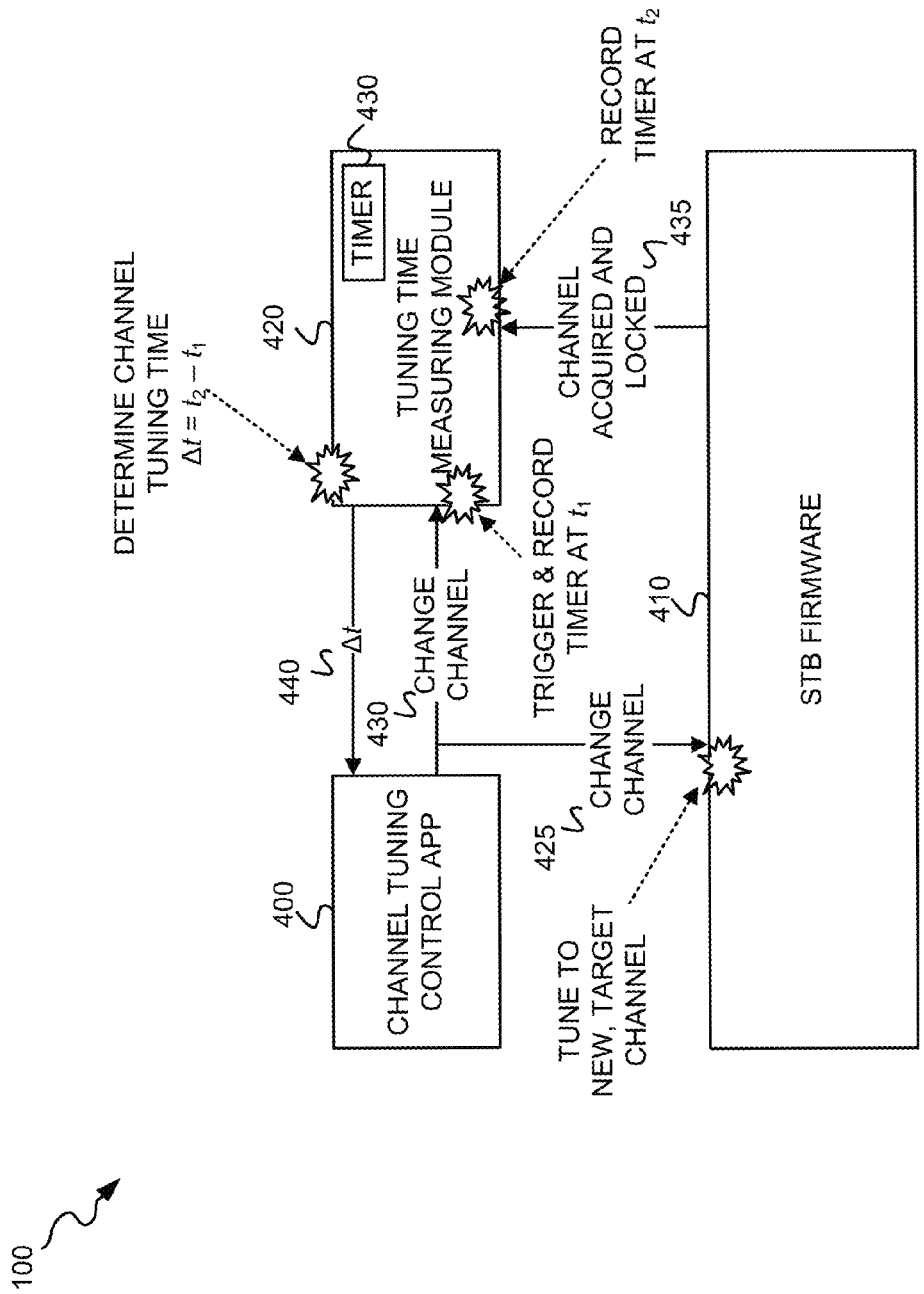
FIG. 6 is a set-top box functional diagram associated with the exemplary process of FIG. 5.

Channel tuning control application 400 may simultaneously signal STB firmware 410 to tune to the new target channel and to signal tuning time measuring module 420 to trigger and record the start of timer 430 at start time $t_1$ (block 510). FIG. 6 depicts channel tuning control application 400 sending a channel change command 425 to STB firmware 410, and another channel change command 430 to tuning time measuring module 420. In response to receipt of channel change command 420, STB firmware 410 may initiate the internal operations associated with changing the channel to a new, target channel. In response to receipt of channel change command 430, tuning time measuring module may record a time $t_1$ (i.e., a start time) from timer 430 that indicates a time at which channel tuning starts.

Tuning time measuring module 420 may receive a signal from STB firmware 410 that indicates that the target channel signal has been acquired and locked, and may record timer 430 at the time $t_2$ (i.e., the stop time) the signal from STB firmware 410 is received (block 520). FIG. 6 depicts a signal 435 being received at tuning time measuring module 420 from STB firmware 410 that indicates that the new, target channel has been acquired and locked. Tuning time measuring module 420 may calculate the channel tuning time ($\Delta t$) by calculating the difference between the timer stop time $t_2$ and the timer start time $t_1$ ($\Delta t=t_2-t_1$), and may send channel tuning time 440 to channel tuning control application 400.

Channel tuning control application 400 may receive the channel tuning time from tuning time measuring module 420, where the channel tuning time is the difference between the timer stop time $t_2$ and the timer start time $t_1$ (block 530). Channel tuning control application 400 may present the channel tuning time (block 540). For example, in an implementation in which a display device (e.g., a television) is connected to STB 100, channel tuning control application 400 may cause the channel tuning time to be displayed on the display device.

Channel tuning control application 400 may send the channel tuning time and data associated with STB 100 to an output port (block 550). If STB 100 is locally connected to an external device (e.g., a computer), channel tuning application 400 may send the channel tuning time (and other associated STB data) to the external device via an output port. Channel tuning control application 400 may send, via network 220, the channel tuning time and data associated with STB 100 to tuning manager 110 (block 560). In addition to sending the channel tuning time to a locally connected device, channel tuning control application 400 may send the channel tuning time across network 220 to tuning manager 110 for storing in tuning measurement DB 160, and for channel tuning behavior analysis. Channel tuning control application 400 may send a message containing each measured channel tuning time to tuning manager 110, or may "batch" multiple channel tuning time measurements together and send them to tuning manager 110 in a single message.

Figure 7:
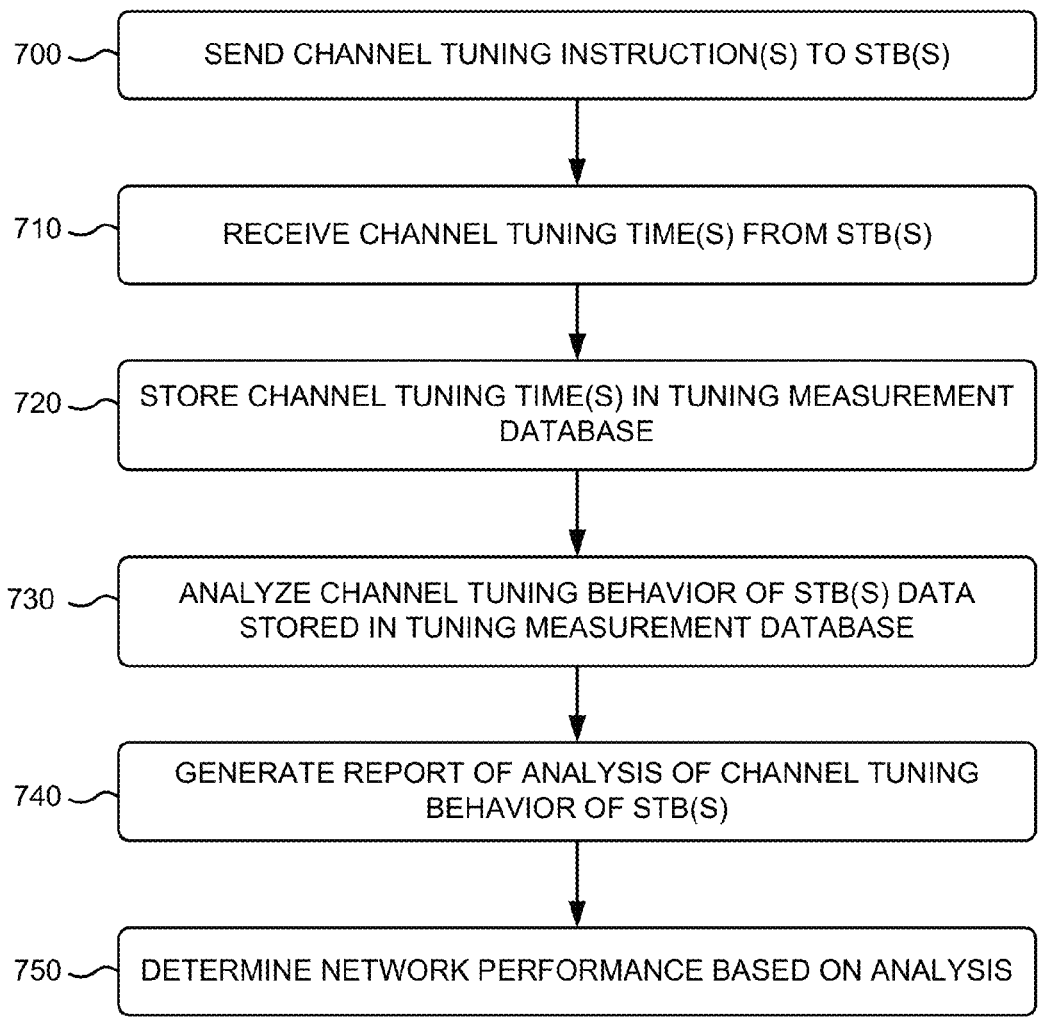
FIG. 7 is a flow diagram that illustrates an exemplary process for instructing and monitoring STB channel tuning operations at tuning manager, and for performing an analysis of the channel tuning behavior by one or more remote STBs.

FIG. 7 is a flow diagram that illustrates an exemplary process for instructing, and monitoring, STB channel tuning operations at tuning manager 110, and for performing an analysis of the channel tuning behavior by one or more remote STBs. The exemplary process of FIG. 7 may be implemented by tuning manager 110. The exemplary process of FIG. 7 is described below with reference to the diagrams of FIGS. 8 and 9.

Figure 8:
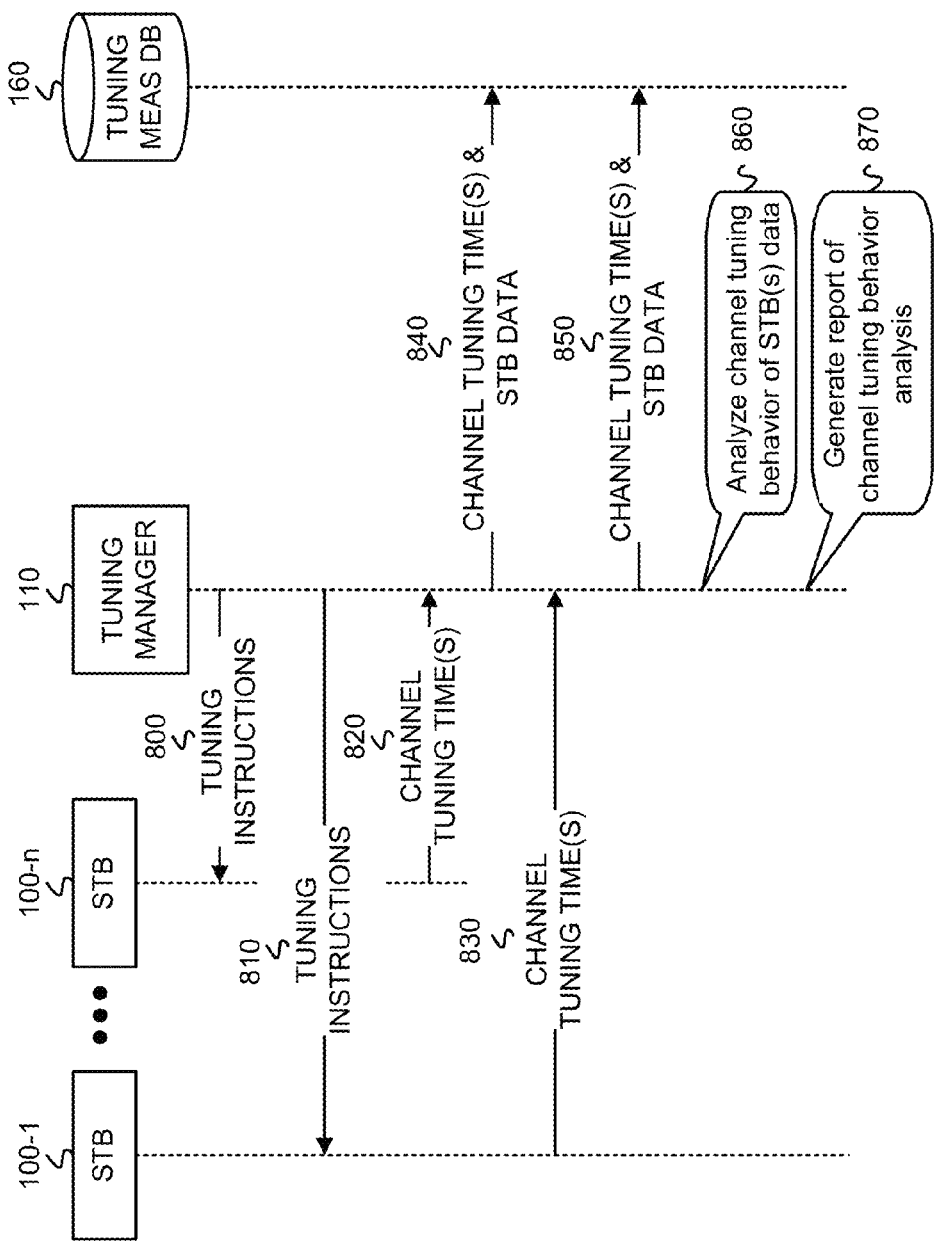
FIG. 8 is an exemplary messaging diagram associated with the exemplary process of FIG. 7.

The exemplary process may include sending a tuning instruction(s) to a STB(s) 100 (block 700). Tuning manager 110 may send a single tuning instruction (e.g., tune to a single, specific channel), or a "batch" of tuning instructions with a sequence of multiple tuning instructions. Tuning manager 110 may send a message containing the tuning instructions to a single STB 100 or to multiple STBs 100. In the event that a given STB 100 is "in use" (e.g., user is watching TV, or DVR recording is in progress), the STB may return a "busy" status to tuning manager 110 and may refuse to engage in channel tuning according to the tuning instruction(s) (or may postpone engaging in channel tuning until user is no longer watching TV). In the event that a given STB 100 is not "in use" (e.g., user is not watching TV, or DVR recording is not in progress), the STB may engage in channel tuning as instructed by the tuning instructions. In some implementations, STB 100 may engage in channel tuning during time periods when the user is not watching TV, and may collect the channel tuning times and send it back to tuning manager 110 in one or more "batches" of channel tuning times. In other implementations, STB 100 may collect channel tuning time data for normal user-initiated channel tunings (i.e., without receiving any channel tuning instructions from tuning manager 110), and may then send this data back to tuning manager 110 in one or more batches. FIG. 8 depicts tuning manager 110 sending a message 800 containing tuning instructions to STB 100-$n$, and a message 810 containing tuning instructions to STB 100-1. Tuning manager 110 may receive a channel tuning time(s) from STB(s) 100 (block 710). In response to the receipt of the channel tuning instructions, each STB 100 may perform a channel tuning operation based on the instructions and return the measured channel tuning time to tuning manager 110. FIG. 8 depicts STB 100-*n* returning a message 820 that includes channel tuning time(s) in response to channel tuning instructions 800. FIG. 8 further depicts STB 100-1 returning a message 830 that includes channel tuning time(s) in response to channel tuning instructions 810.

Tuning manager 110 may store the channel tuning time(s) from STB(s) 100 in tuning measurement DB 160 (block 720). FIG. 8 shows tuning manager 110 sending a message 840 with a channel tuning time(s) and associated STB data from STB 100-*n* to tuning measurement DB 160, and a message 850 with a channel tuning time(s) and associated STB data from STB 100-1 to tuning measurement DB 160.

Figure 9:
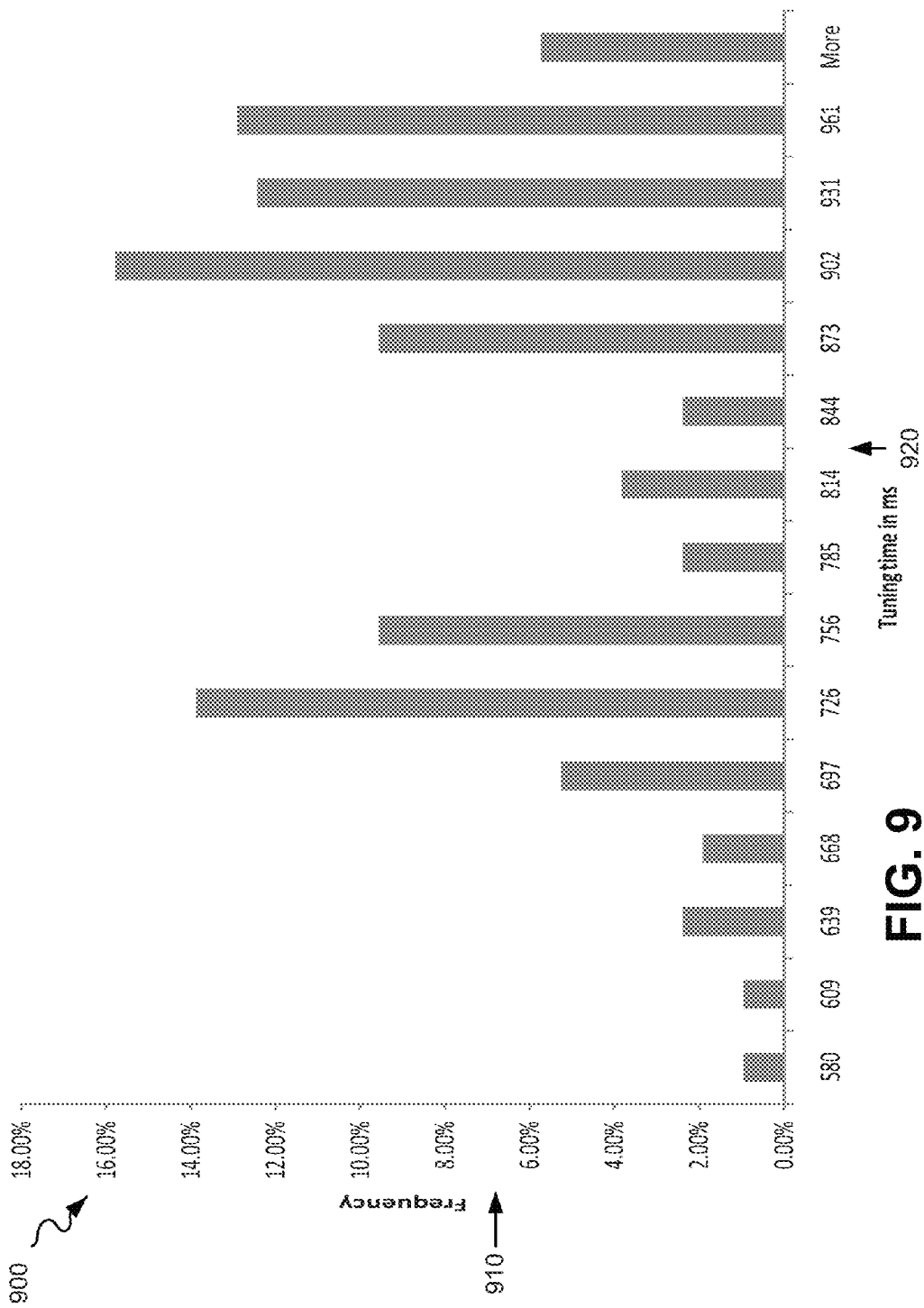
FIG. 9 is a diagram of an exemplary report generated by the tuning manager during the exemplary process of FIG. 7.

Tuning manager 110 may analyze the channel tuning behavior of STB(s) data stored in tuning measurement DB 160 (block 730). The analysis may include, for example, determining a frequency associated with the occurrence of specific tuning times (e.g., in milliseconds) for repeated occurrences of the channel tuning operation. For example, a channel tuning operation may be repeated 100 times, and a frequency of occurrence of specific channel tuning times may be determined. FIG. 8 depicts tuning manager 110 analyzing 860 the channel tuning behavior of STB(s) data. Tuning manager 110 may generate a report of the analysis of the channel tuning behavior of the STB(s) (block 740). As shown in FIG. 9, the report may include, for example, a bar graph 900 that graphs the frequency 910 of occurrence of tuning times on the y-axis, and specific tuning times 920 on the x-axis. For example, bar graph 900 shows that the most frequent occurrence of a channel tuning time is 16.00% for a channel tuning time of 902 ms. Tuning manager 110 may supply the report generated in block 740 to respective STBs 100, or to other network devices not shown in FIG. 2.

Tuning manager 110 may determine network performance based on the analysis of blocks 730 and 740 (block 750). The network performance determination may include determining the performance of equipment or devices of network 220, such as, for example, network switches/routers, optical line terminations (OLTs), or optical network terminals (ONTs). Various performance diagnostics may be performed by formulating specific instructions that can be sent to STBs in block 700, and then analyzing the reported channel tuning behavior of the STBs. As one example of network performance determination, multiple STBs may be instructed to tune to a same channel, and the load on network 220 may be analyzed to determine the performance of underlying network devices. The network performance determined in block 750 may further be used to change out (e.g., switch out or replace), or to adjust the parameters of, network devices or equipment. For example, an analysis of channel tuning behavior may identify that the encoding of data on a certain channel is not optimum thus causing increased channel tuning times. As another example, an analysis of channel tuning behavior may identify that one or more routers in network 220 are incorrectly configured resulting in increased channel tuning times. The changing out or adjustment of network devices or equipment, or adjustment of parameters of network devices or equipment, may be performed automatically (e.g., automatically switching out a failing router and switching in a back-up router), or may be performed manually.

Exemplary implementations described herein implement functionally within STBs that permit the STBs to internally perform channel tuning time measurements, and to provide those measurements to an external device, such as to tuning manager 110. Tuning manager 110 may instruct the STBs to perform channel tuning time measurements, and may monitor the performance of the instructed channel tuning time measurements. Tuning manager 110 may additionally analyze series of channel tuning time measurements and generate reports of the analyzed channel tuning behavior. Tuning manager 110 may also determine a performance of the network based on an analysis of the reported channel tuning behavior.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 5 and 7, the order of the blocks may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
receiving, at a network device across a network, measurements of channel tuning times, associated with changing channels, from multiple, different set-top boxes (STBs), wherein the channel tuning times are measured internally within each of the multiple, different STBs and wherein each of the channel tuning times includes a span of time between a start of a channel change and when a program signal has been acquired and locked on a target channel;
storing the measurements of the channel tuning times as data in a data structure;
analyzing the measurements of channel tuning times of at least one of the multiple, different STBs based on the data stored in the data structure to determine frequencies of occurrences of different ones of the channel tuning times; and
generating a report of the channel tuning times analysis of the at least one of the multiple, different STBs, wherein the report includes the determined frequencies of occurrences of the different ones of the channel tuning times.

2. The method of claim 1, further comprising:
determining a performance of the network based on the channel tuning times analysis.

3. The method of claim 2, wherein determining the performance of the network comprises:
determining a performance of equipment or devices of the network.

4. The method of claim 2, further comprising:
changing out, or adjusting, network devices or equipment based on the determined network performance.

5. The method of claim 1, wherein the channels comprise one or more of quadrature amplitude modulated (QAM) high definition (HD), QAM standard definition (SD), Internet Protocol Television (IPTV) HD, or IPTV SD channels.

6. The method of claim 1, wherein the STBs reside at multiple, different geographic locations.

7. The method of claim 1, wherein each of the multiple, different STBs comprises a device that connects to an external source of signal and turns the signal into content for display by a display device.

8. The method of claim 1, wherein generating the report of the channel tuning times analysis includes generating a graph that depicts the determined frequencies of occurrences of the different ones of the channel tuning times on a first axis of the graph and the different ones of the channel tuning times on a second axis of the graph.

9. The method of claim 1, wherein the network includes an optical fiber network.

10. The method of claim 1, wherein each of the multiple, different STBs comprises a device that connects to an external source of signal and turns the signal into content for display by a display device and wherein the channels comprise one or more of quadrature amplitude modulated (QAM) high definition (HD), QAM standard definition (SD), Internet Protocol Television (IPTV) HD, or IPTV SD channels.

11. A network device, comprising:
a communication interface connected to a network and configured to receive measurements of channel tuning times, associated with changing channels, from multiple, different set-top boxes (STBs) from across the network, wherein the channels comprise one or more of quadrature amplitude modulated (QAM) high definition (HD) or QAM standard definition (SD) channels, wherein the channel tuning times are measured internally within each of the multiple, different STBs, and wherein each of the channel tuning times includes a span of time between a start of a channel change and when a program signal has been acquired and locked on a target channel of the channels, wherein acquiring and locking on the target channel includes tuning to a correct QAM frequency of the target channel and locating a multiplexed stream on the target channel; and
a processing unit configured to:
analyze channel tuning behavior of at least one of the multiple, different STBs based on the measurements of channel tuning times, and
generate a report of the channel tuning behavior of the at least one of the multiple, different STBs.

12. The network device of claim 11, wherein the processing unit is further configured to:
determine a performance of the network based on the channel tuning behavior analysis.

13. The network device of claim 12, wherein, when determining the performance of the network, the processing unit is configured to:
determine a performance of equipment or devices of the network.

14. The network device of claim 11, wherein the processing unit is further configured to:
store the measurements of the channel tuning times as data in a data structure,
wherein, when generating the report of the channel tuning behavior, the processing unit is configured to generate the report of the channel tuning behavior based on the measurements stored in the data structure.

15. The network device of claim 11, wherein the STBs reside at multiple different geographic locations.

16. The network device of claim 11, wherein each of the multiple, different STBs comprises a device that connects to an external source of signal and turns the signal into content for display by a display device.

17. The network device of claim 11, wherein the network includes an optical fiber network.

18. The network device of claim 11, wherein each of the multiple, different STBs comprises a device that connects to an external source of signal and turns the signal into content for display by a display device and wherein the channels comprise one or more of quadrature amplitude modulated (QAM) high definition (HD), QAM standard definition (SD), Internet Protocol Television (IPTV) HD, or IPTV SD channels.

19. A set-top box (STB), comprising:
firmware configured to tune to channels on a network connected to the STB;
a tuning time measuring module that includes a timer; and
a channel tuning control application configured to:
simultaneously signal the firmware to tune to a new channel and signal the time measuring module to trigger and record the timer at a start time ($t_1$), wherein the tuning time measuring module is configured to:
receive a signal from the firmware indicating that the new channel has been acquired and locked,
record the timer at a stop time ($t_2$) when the new channel has been acquired and locked, and
calculate and send a channel tuning time to the channel tuning control application, wherein the channel tuning time comprises a difference between the stop time and the start time, and
wherein the channel tuning control application is further configured to:
receive the channel tuning time from the tuning time measuring module, and
send the channel tuning time to a device external to the STB.

20. The STB of claim 19, wherein the device external to the STB comprises a network device connected to the STB via a network.

21. The STB of claim 19, wherein the device external to the STB comprises a computer locally connected to the STB.

22. The STB of claim 19, wherein the channels comprises one or more of quadrature amplitude modulated (QAM) high definition (HD), QAM standard definition (SD), Internet Protocol Television (IPTV) HD, or IPTV SD channels.

23. The STB of claim 19, wherein the channel tuning control application is further configured to:
receive, from an external device, over the network, instructions to measure the channel tuning time.

24. The STB of claim 19, wherein the STB comprises a device that connects to an external source of signal via the network and turns the signal into content for display by a display device.

* * * * *